United States Patent [19]
Weissgerber et al.

[11] Patent Number: 5,207,515
[45] Date of Patent: May 4, 1993

[54] BALL BEARING WITH SPHERICAL SEGMENT INNER RING AND DIVIDED OUTER RING

[75] Inventors: Alois Weissgerber, Schweinfurt; Reinhard Hock, Dittelbrunn; Stefan Wessel, Geldersheim, all of Fed. Rep. of Germany

[73] Assignee: FAG Kugelfischer Georg Schäfer KGaA, Fed. Rep. of Germany

[21] Appl. No.: 831,910

[22] Filed: Feb. 6, 1992

[30] Foreign Application Priority Data

Mar. 13, 1991 [DE] Fed. Rep. of Germany ....... 4107830

[51] Int. Cl.$^5$ .......................................... F16C 33/58
[52] U.S. Cl. .................................. 384/516; 384/506; 384/513
[58] Field of Search ............... 384/513, 516, 501, 506, 384/514, 515

[56] References Cited

U.S. PATENT DOCUMENTS

| | | | |
|---|---|---|---|
| 3,362,761 | 1/1968 | Zachariassen | 384/516 |
| 4,718,781 | 1/1988 | Gerard | 384/516 |
| 4,859,090 | 8/1989 | Smith | 384/516 |
| 5,102,241 | 4/1992 | Pflungner | 384/513 |

*Primary Examiner*—Lenard A. Footland
*Attorney, Agent, or Firm*—Ostrolenk, Faber, Gerb & Soffen

[57] ABSTRACT

To produce an inexpensive small size ball bearing, the inner ring races are formed of spherical segments which are connected to each other at flattened connection places. A row of balls is guided by a respective inner ring race contact point on each of the segments in the region of the attachment place between two segments. In a four point ball bearing, the single row of balls contacts two contact points, one on each spherical segment, that define the inner race and contacts two races formed in the outer ring. In a three point bearing, there are two axially spaced apart rows of balls and three spherical segments in an axial row, two of the spherical segments of the inner ring define two of the inner race contact points for one of the ball rows and two other spherical segments of the inner ring defined two of the inner race contact points for the other row of balls. In both embodiments, the outer ring is split into two parts, each having one contact point on it. Axial adjustment of the outer ring parts adjust the position of the outer races and the contact points and takes up play in the bearing. The axially outermost spherical segments continue spherically outward to housings at opposite sides of the bearing. The housings include depressions that receive the extended parts of the spherical segments therein.

17 Claims, 1 Drawing Sheet

BALL BEARING WITH SPHERICAL SEGMENT INNER RING AND DIVIDED OUTER RING

BACKGROUND OF THE INVENTION

The present invention relates to a four point of contact ball bearing or to a double-row, three-point of contact ball bearing and to means for fixing the bearing parts in position.

Four-point ball bearings of the type indicated are known from Federal Republic of Germany Patent 905 561. In that publication, the races of the bearing rings are developed in the shape of raised regions of balls. The centers of those regions lie on the axis of the bearing. The embodiments shown have spherical regions which have flattenings on both sides. The regions used as inner rings are provided with a bore to receive a shaft. This structure makes necessary the provision of additional attachment surfaces and parts, for instance in the form of the shaft. Since all of these surfaces and parts have manufacturing tolerances, additional inaccuracies result which cannot be accepted upon use of the bearing in swing positioners of disk storages. Since these bearings are very small, with an outside diameter of the outer ring <2 cm, these conditions are even more unfavorable. Although it is possible to produce even highly precise small anti-friction bearings by very precise manufacture, this requires a disproportionately high expense. Furthermore, due to the small size of such bearings, there is still no assurance of accuracy, since frequently, several tolerance deviations are present together. When the deviations add on in the same direction, the bearing is frequently also unusable.

SUMMARY OF THE INVENTION

It is an object of the present invention to provide a bearing which does not have the above indicated disadvantages, which is simple to manufacture despite its small size, and which can be produced with great precision in the region of the races and in the attachment region.

To produce an inexpensive small size bearing with small size rolling elements, e.g. in the form of balls, each inner ring race is formed of spherical segments which are connected to each other at flattened connection places. A row of bearing balls is guided by a respective inner ring race. The race is defined by a respective annular contact line around each of the segments in the region of the attachment place between the segments. Therefore, each inner race is defined by two contact lines. In a four point ball bearing, the single row of bearing balls contacts contact lines which define the inner race and contacts two annular contact lines which define an outer race formed in the outer ring. In a three point bearing, there are two rows of bearing balls, and the inner ring is comprised of three spherical segments. Two of the spherical segments define two contact lines which define the inner race for one of the rows of balls and two of the spherical segments define two contact lines which define the inner race for the other row of balls. The outermost spherical segments continue spherically shaped and outward to housings at opposite sides of the bearing. The housing has depressions that receive the respective spherical segment therein.

In both of the four point and the three point embodiments, the outer ring is split into two axial parts, each having one outer race on it, and axial adjustment of the outer ring parts adjusts the positions of the races and takes up play in the bearing.

If the inner ring is comprised of spherical segments which, for instance, comprise two approximately "three-quarter balls", these cooperating spherical segments provide a highly precise inner race for a row of the bearing balls on the inner ring since the spherical segments of the inner ring can be produced with very high accuracy. Since the spherical segments of the inner ring can be taken from the series manufacture of ball bearings and need be only further processed to be flattened at one side, the spherical segments can be produced in a simple manner as mass produced articles.

It is of particular advantage that the continuations of both spherical segments beyond the inner ring races serve as a replacement for the shaft on which the inner ring or inner races are defined. The spherical segment continuations are received in supporting housing depressions which have preferably conical spherical segment receiving surfaces. Thus, the highly precise spherical surfaces are precisely received in the bearing housing. This avoids above indicated disadvantages due to the elimination of additional surfaces and parts to be machined, for instance, a shaft. Particularly in the case of small bearings, this possibility is very favorable since even small balls can be produced with very high precision.

The invention can also be used for a double-row three-point bearing. In that case, an additional spherical part of about "one quarter ball" is installed between the two three-quarter ball spherical segments. This middle segment is flattened on both of its opposite sides, and it is disposed between the flats of the two "three-quarter balls". The attachment of the three inner ring spherical segments at the two connection places is preferably effected by bonding.

Since the traveling bearing balls must also be easily and accurately guided in the region of the outer ring, the outer ring is comprised of two stepped, annular parts having either conical or concavely curved race sections in a four point bearing or convexly curved race sections in a two-row, three-point bearing. One of those stepped outer ring parts can be inserted axially into the other. The ring parts inserted in one another are then axially shiftable until the bearing balls rest free of play or under tension against all of their ring races. While the balls are in this position, the outer ring parts are bonded to each other. The bearing can then be manufactured and adjusted simply but nevertheless accurately also in this region.

Other objects and features of the present invention will become apparent from the following description of the invention which refers to the accompanying drawings.

DETAILED DESCRIPTION OF THE INVENTION

Figure 1:
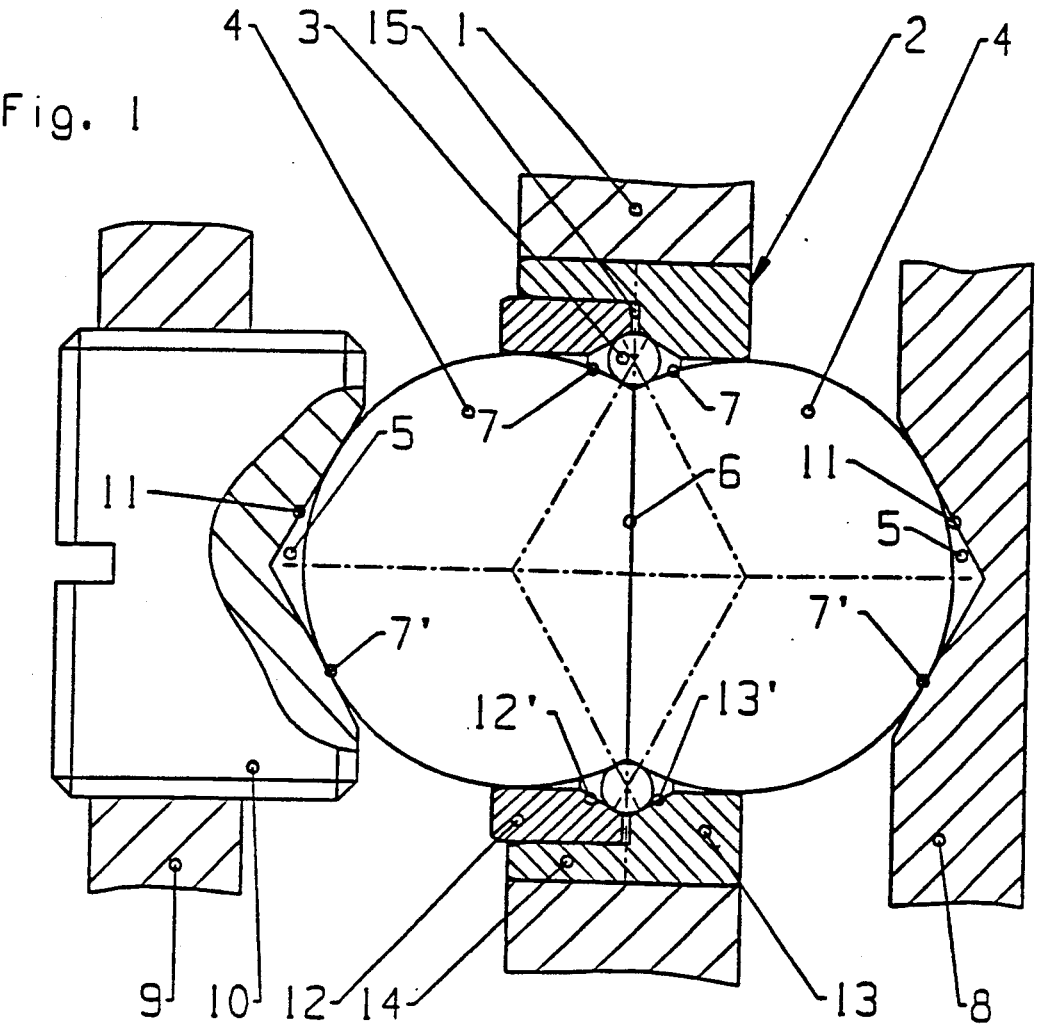
FIG. 1 is a longitudinal section through a single-row four-point ball bearing.

Referring to FIG. 1, the illustrated single-row, four-point bearing includes a two part outer ring 2 which is arranged in an external bearing housing 1. An annular row of rolling element bearing balls 3 rides on the outer ring race and on the inner ring race of an inner ring.

The inner ring is comprised of two partially spherical segments 4 which are bonded together at their flats where the meet at a connection place 6. Each spherical segment 4 continues spherically outward to rest in a respective one of two opposite, spaced apart, conical housing depressions 5. The customary cylindrical axle or shaft which includes the inner race of such a bearing is replaced here by the two partially spherical segments 4.

Each spherical segment 4 has a cooperating flattened side that abuts the flattened side of the other segment at their connection place 6. The flat sides are connected to each other by bonding. The curvatures of the spherical segments 4 produce in the axial region of and at the opposite sides of the connection place 6 two annular lines of contact of the balls 3 with the inner ring, i.e. with the spherical parts 4. Those two lines of contact together define the inner race for the balls 3.

The inner ring is comprised of two spherical segments 4 having the respective spherical surfaces 7. These spherical surfaces 7 continue circumferentially beyond the inner race and form respective spherical attachment sections 7' in their continued regions. The sections 7' are arranged opposite respective depressions 5 in the housing. The housing here is comprised of a plate 8 at one spherical surface section 7' and of a threaded bolt 10 which can be screwed into another fixed plate 9 at the other spherical surface section 7'. The plate 8 and the threaded bolt 10 have opposite depressions 5 each formed of respective conical surfaces 11. Within each depression 5 there can be an exact fixing of the respective spherical segments 4 via their respective spherical surface sections 7'.

The precision of the bearing is obtained in the region of the outer ring 2. That ring 2 is comprised of two ring parts, part 12 at one axial side of the row of balls 3 and part 13 at the other axial side thereof. The ring parts 12, 13 have respective oblique chamfers 12', 13', which each define a respective annular line of contact for the balls and which together define the outer race over which the balls 3 roll. The chamfers may be described as conically shaped race sections 12', 13'.

Play free adjustment of the four-point bearing is possible because the ring parts 12 and 13, and thus their lines of contact with the balls are axially adjustable. One ring part 13 has a radially outward step 14, which surrounds the other ring part 12. The opposed axial end surfaces of the outer ring parts face each other with a clearance 15 between them. The clearance 15 makes it possible to displace the rings 12, 13 axially with respect to each other until a play free adjustment of the particular bearing is achieved. The ring parts 12, 13 are then bonded together at the desired adjusted position.

Figure 2:
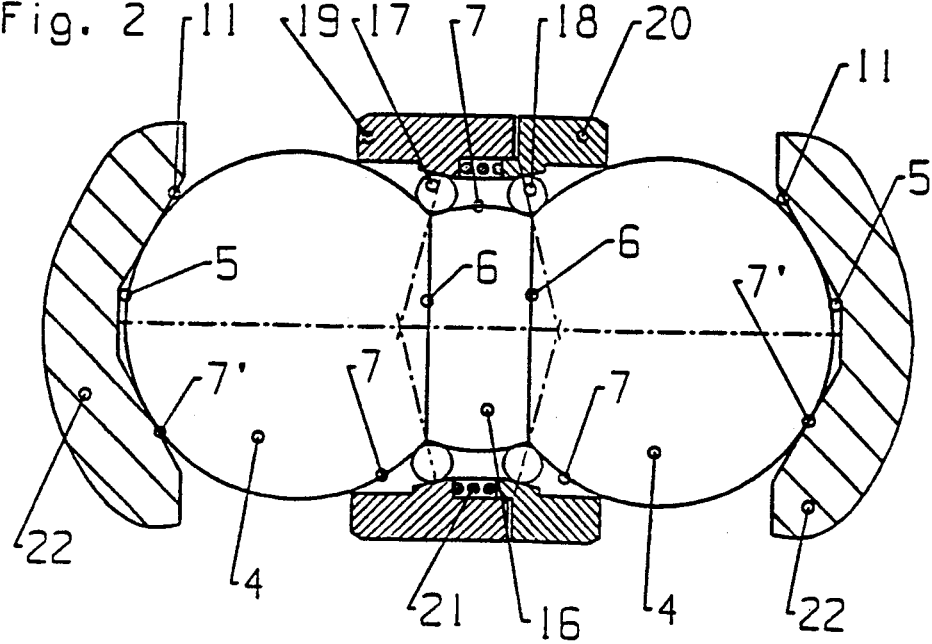
FIG. 2 is a longitudinal section through a double-row three-point ball bearing.

The double-row three-point ball bearing of FIG. 2 is constructed according to the same principle as the bearing of FIG. 1. In this case, the shaft replacement inner ring is comprised of three spherical segments. A spherical segment 16 having two opposite flat and parallel sides 15 is bonded between the two spherical segments 4 at the connection places 6 at the flat sides of the two segments 4. The segment 16 is of smaller diameter than the segments 4, which biases the ball rows inward, as described below. The spherical segments 4 and 16 are all arrayed along an axis, i.e., the bearing axis. In the axial regions of each of the two axially spaced apart connection places 6, there is a respective inner ring race, one race for each of the two rows of balls 17 and 18. As in the embodiment of FIG. 1, each row of balls contacts the inner ring at the respective axially outer spherical segment at its axial side and at the middle spherical segment near to and outward of the connection place to define the respective inner race for that row of balls.

The outer ring also is comprised of two parts 19 and 20. Each part carries a respective outer race for one of the ball rows. The outer ring parts are normally urged away from each other by a compression spring 21 between them. The spherical rounding and diameters of the central spherical segment 16 and of the outward spherical segments 4 cause the two points of contact of each row of balls with its inner race to bias the balls axially inward against their respective outer races and in opposition to the axial spreading force of the spring 21. In FIG. 2, the outer ring races are convexly curved and therefore define only one annular line of contact, so that each contact line on each outer ring part is engaged by one respective row of the bearing balls. These features provide a play free or pretensioned double-row three-point ball bearing. This bearing embodiment can also be accurately produced due to the use of spherical segments 4 and 16. In view of the mounting of the spherical parts via the opposite end spherical fastening sections 7', the spherical segments 4, 16 can be accurately positioned within the respective depressions 5, 11 at both axial sides of the housing 22.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bearing comprising
    an outer ring having an outer race for contacting bearing rolling elements,
    an inner ring radially inside the outer ring and having an inner race with two annular lines of contact for contacting a row of bearing rolling elements, and
    a row of bearing rolling elements between and contacting the outer race and the inner race;
    the inner ring comprising two partial spherical segments which are connected to at each other at a connection place, the spherical segments and the bearing rolling elements being respectively so shaped that each inner race annular line of contact for the row of rolling elements is defined on a respective one of the spherical ring segments and is in the axial region of the connection place;
    at least a first of the spherical segments of the inner ring including an extended part extending axially away from the connection place and away from the row of rolling elements; a housing including a first part with a housing depression therein for receiving the extended part of the first spherical segment in a manner which enables rotation of the inner ring with respect to the housing.

2. The bearing of claim 1, wherein the housing includes a second housing part with a second housing depression therein which is opposite the first mentioned housing depression, and the second of the spherical segments including a second extended part which extends away from the connection place and into the second housing depression, whereby the first and second spherical segments are supported respectively in the first and second housing depressions to enable rotation of the spherical segments and the inner ring with respect to the housing.

3. The bearing of claim 2, wherein the spherical segments are attached to each other at a flattened connection place and the contact lines of the inner race are defined at opposite axial sides of the connection place.

4. The bearing of claim 1, wherein the outer race is defined by two annular lines of contact for the row of rolling elements and on the outer ring.

5. The bearing of claim 4, wherein the outer ring is comprised of two outer ring parts which are shiftable axially of the bearing with respect to each other and with respect to the inner ring, and each of the outer ring parts having a respective one of the outer race contact lines defined on it, whereby axial shifting of the parts of the outer ring adjusts the axial locations of the outer race contact lines.

6. The bearing of claim 5, further comprising means for fixing the outer ring parts at a fixed axial position with respect to each other.

7. The bearing of claim 5, wherein the row of rolling elements engages both of the inner race spherical segments in the axial region of the connection place and also engages the contact lines on both of the outer ring parts, thereby defining a four point bearing.

8. The bearing of claim 7, wherein the bearing rolling elements are balls and the bearing is a four point ball bearing.

9. The bearing of claim 8, wherein the outer ring race is concavely curved at the contact lines.

10. The bearing of claim 1, wherein the inner ring comprises three of the partial spherical segments arranged in an axial row, with one of the three convex spherical segments being in the middle between the other two spherical segments and the middle segment having a first side which is attached at a first connection place with the first spherical segment and the middle segment having a second opposite side which is attached at a second connection place with the second spherical segment; the middle segment and the first segment defining a first pair of inner race lines of contact; the middle segment and the second segment defining a second pair of inner race lines of contact;

a respective first row of the rolling elements contacting the first pair of the inner ring contact lines and contacting the outer race, thereby defining a three point bearing, a respective second row of the rolling elements contacting the second pair of the inner ring contact lines and contacting the outer race, thereby defining a second three point bearing.

11. The bearing of claim 10, wherein the outer ring includes a respective outer race annular line of contact for engaging each row of rolling elements.

12. The bearing of claim 10, wherein the outer ring is comprised of two parts which are axially movable with respect to each other, and a respective one of the outer races being defined on each part of the outer ring.

13. The bearing of claim 1, wherein the outer ring is comprised of two outer ring parts which are shiftable axially of the bearing with respect to each other and with respect to the inner ring, and each of the outer ring parts having a respective one of the outer race lines of contact.

14. The bearing of claim 1, wherein the rolling elements are balls.

15. The bearing of claim 14, wherein the outer ring has two of the races which are generally convexly curved.

16. The bearing of claim 15, wherein the inner ring races and the outer ring races are so shaped and placed that the bearing balls in each of the rows apply a biasing force that has a component axially toward the other row of bearing balls;

the outer ring being comprised of two parts which are axially movable with respect to each other, and a respective one of the outer races being defined on each part of the outer ring.

17. The bearing of claim 16, further comprising means normally biasing the outer ring parts apart in opposition to the bias thereupon of the two rows of bearing balls.

* * * * *